United States Patent
Kita

(10) Patent No.: US 7,123,775 B2
(45) Date of Patent: Oct. 17, 2006

(54) IMAGE PROCESSING METHOD, IMAGE PROCESSING PROGRAM AND IMAGE PROCESSING APPARATUS

(75) Inventor: Koji Kita, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 770 days.

(21) Appl. No.: 10/377,161

(22) Filed: Feb. 28, 2003

(65) Prior Publication Data

US 2003/0168601 A1    Sep. 11, 2003

(30) Foreign Application Priority Data

Mar. 4, 2002   (JP) ............................. 2002-058046

(51) Int. Cl.
  *G06K 9/36* (2006.01)
(52) U.S. Cl. .............. 382/254; 358/3.26; 348/246; 250/341.1
(58) Field of Classification Search ............... 382/145, 382/149, 254, 275; 358/3.24, 3.26, 3.27, 358/513, 514; 348/246, 247; 250/341.1, 250/201.2, 201.4
See application file for complete search history.

(56) References Cited

U.S. PATENT DOCUMENTS

| | | | |
|---|---|---|---|
| 5,266,805 A | 11/1993 | Edgar | |
| 6,590,679 B1* | 7/2003 | Edgar et al. | 358/514 |
| 6,683,643 B1* | 1/2004 | Takayama et al. | 348/247 |
| 6,836,560 B1* | 12/2004 | Emery | 382/145 |
| 2001/0035491 A1 | 11/2001 | Ochiai et al. | |
| 2002/0048411 A1 | 4/2002 | Takayama et al. | |
| 2005/0030394 A1* | 2/2005 | Mendis et al. | 348/246 |

FOREIGN PATENT DOCUMENTS

EP        0 569 142 A1    11/1993

(Continued)

*Primary Examiner*—Yon J. Couso
(74) *Attorney, Agent, or Firm*—Fulbright & Jaworski L.L.P.

(57) ABSTRACT

An image processing method is provided for obtaining a non-deteriorated pixel value as a pixel value of a pixel free from a defect such as a scar or dust from non-visible beam image information obtained from a defective recording medium having the scar or dust. The method includes the steps of:

obtaining a calculated value: Y for each pair of samples of corresponding pixels of visible beam image information and said non-visible beam image information both obtained from the recording medium, $$Y = \text{Mean}[IR] - IR + X,$$

where, Mean [IR] is an average pixel value of the non-visible beam image information, IR is a pixel value of the non-visible beam image information and X is a pixel value of the visible beam image information;

obtaining a regression equation with the pixel value: X of the visible beam image information as an independent variable and the calculated value: Y as a dependent variable;

deriving the non-deteriorated image pixel value from the regression equation; and obtaining a corrected pixel value: Z for a deteriorated pixel in the visible beam image information by a following equation;

corrected pixel value: $Z = CF - IR + X,$ where CF is the non-deteriorated pixel value, IR is the pixel value of the non-visible beam image information and X is the pixel value of the visible beam image information.

9 Claims, 9 Drawing Sheets

FOREIGN PATENT DOCUMENTS

| | | |
|---|---|---|
| EP | 0 893 914 A2 | 1/1999 |
| EP | 1 100 254 A1 | 5/2001 |
| JP | 6-28468 | 4/1994 |
| JP | 2000-341473 | 12/2000 |
| JP | 2001-157003 | 6/2001 |
| WO | WO 01/20898 A1 | 3/2001 |

* cited by examiner

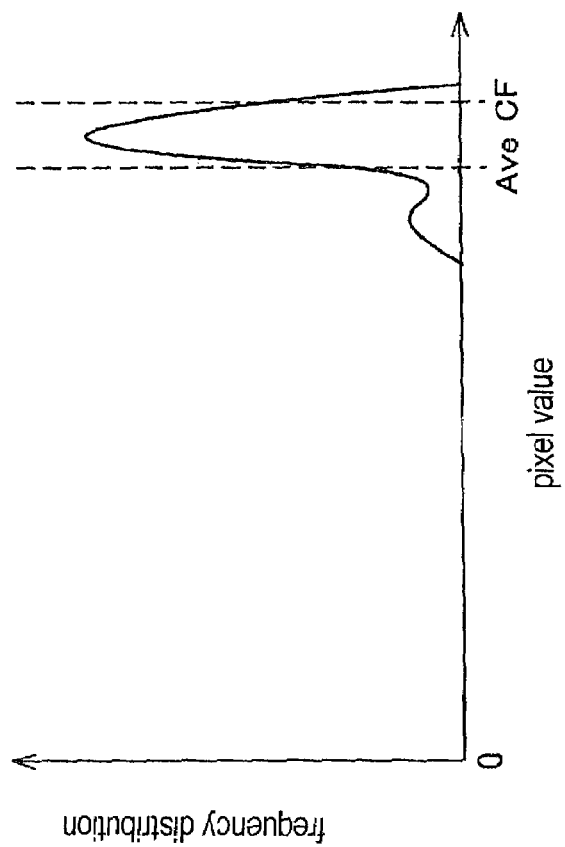
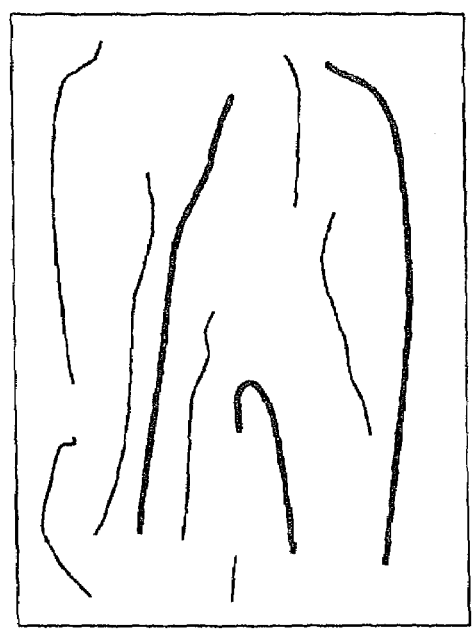
FIG. 9A
FIG. 9B

IMAGE PROCESSING METHOD, IMAGE PROCESSING PROGRAM AND IMAGE PROCESSING APPARATUS

BACKGROUND OF THE INVENTION

1. Field of the Invention

The present invention relates to a technique of effecting an image processing on image information (image data) obtained by an image reader such as a scanner from an image recorded on a recording medium such as a photographic film. More particularly, the invention relates to a technique of effecting such processing on the image data for eliminating therefrom effect from a defect such as scratch or dust present on the recording medium.

2. Description of the Related Art

As printers for outputting to a print paper an image recorded on a photographic film such as a positive or a negative (to be referred to as "film" hereinafter), there are known an analog printer and a digital printer. The analog printer exposes the print paper with an optical beam transmitted through the film image. With the digital printer, the optical beam transmitted through the film image is subjected to a photoelectric conversion through a CCD (Charged Coupled Device) or the like and then digitized into image data and then the print paper is exposed with an optical beam modulated according to the image data.

With both types of printers above, if a defect such as scar or dust (to be generically referred to as "defect" hereinafter) is present on the film surface, this can result in such inconvenience as a unwanted local density variation or local deletion in the image printed on the print paper. For this reason, both types have employed a diffusion optical beam as the beam to be transmitted through the film.

In the case of the digital printer, the effect from a defect can be effectively eliminated by effecting an image processing on the digitized image data. Examples of such image processing method are disclosed in e.g. Japanese Patent Application "Kokai" No: Hei. 6-28468 (laid-open on Feb. 4, 1994, corresponding to U.S. Pat. No. 5,266,805), Japanese Patent Application "Kokai" No.: 2000-341473 (laid open on Dec. 8, 2000), and Japanese Patent Application "Kokai" No.: 2001-157003 (laid open on Jun. 8, 2001, corresponding to EP1100254A1).

With the image processing methods disclosed by the above publications, an infrared is transmitted through a film to obtain infrared image information. The infrared, when transmitted through the film, is diffusion by a defect on the film, but basically is not affected by pixels constituting the image of the film. Therefore, the infrared image information obtained from the infrared transmitted through the film will contain information of the defect only with high accuracy. Hence, from this infrared image information, it is possible to obtain the amount of the portion of the transmitted beam which was lost due to the presence of the defect. Then, by using this amount of loss due to the effect from the defect, the effect from the defect can be effectively eliminated from visible image information of the film.

In order to obtain such loss amount due to a defect, in the infrared image information, distinction needs to be made between a "non-defective" pixel (to be referred to a "non-deteriorated pixel" hereinafter) and a "defective" pixel (to be referred to as "deteriorated pixel" hereinafter). A non-defective portion of the film allows transmission of a greater amount of the beam than a defective portion, so that the non-deteriorated pixel in the infrared image information has a greater pixel value (density value) than the deteriorated pixel in the same. Therefore, the distinction between the non-deteriorated pixel and the deteriorated pixel is possible by setting a threshold value for pixel values of an infrared image information and then judging a pixel having a pixel value higher than the threshold value as a non-deteriorated pixel while judging a pixel having a pixel value smaller than the threshold value as a deteriorated pixel.

However, as films have differing transmission amounts for an infrared depending on the film type, the maker, sensitivity, etc., it is not possible to make the above distinction with a single threshold value. As a solution to this problem, the above-cited Japanese Patent Application "Kokai" No.: 2000-341473 discloses a method in which film characteristics information relating to e.g. positive/negative, presence/absence of a magnetic layer is obtained for each particular film and then the threshold value is adjusted based on this information.

Incidentally, if a pixel value of a non-deteriorated pixel (to be referred to as "non-deteriorated pixel value" hereinafter) can be obtained from the infrared image information for each film, the above problem can be solved by setting this non-deteriorated pixel value as the threshold.

Ideally, the non-deteriorated pixel value can be considered as a maximum value of pixel values of the infrared image information. As a matter of fact, even such non-deteriorated pixel value can vary, due to noise, sensitivity of each image pickup element of a CCD camera, density irregularity in the film, etc. Namely, it will be problematic to simply interpret a maximum pixel value as the non-deteriorated pixel value for its use as the threshold value.

On the other hand, as a value approximating the non-deteriorated pixel value, an average value of pixel values of the infrared image information (to be referred to as an "average pixel value" hereinafter) can be cited for example. Yet, since deteriorated pixels have smaller pixel values than non-deteriorated pixels as described hereinbefore, such average pixel value will be lower if a large amount of defect is present on the film, thus resulting in a significant difference between the non-deteriorated pixel value and the average pixel value.

This phenomenon will be described in greater details with reference to FIGS. 8 and 9. FIGS. 8A and 8B show infrared image information (image data) obtained from a film having a small amount of defect and frequency distribution of pixel values of this infrared image information, respectively. Similarly, FIGS. 9A and 9B show infrared image information (image data) obtained from a film having a large amount of defect and frequency distribution of pixel values of this infrared image information, respectively.

In the case of the film having a small amount of defect as shown in FIG. 8A, there is observed a conspicuous concentration of the frequency distribution of the pixel values of the infrared image information obtained therefrom in the vicinity of the non-deteriorated pixel value: CF as shown in FIG. 8B. In this case, though not shown, the average pixel value: Mean [IR] of the infrared image is approximate to the non-deteriorated image value: CF.

On the other hand, in the case of the film having a large amount of defect as shown in FIG. 9A, the frequency distribution of the pixel values of the infrared image information obtained therefrom is shifted from the non-deteriorated pixel value: CF to the lower pixel value side (to the left in the graph). In this case, the average pixel value: Mean [IR] (denoted as: Ave in the graph of FIG. 9B) of the infrared image information is smaller than the non-deteriorated pixel value: CF. Then, if the distinction of deteriorated pixels is made with using this average value: Mean [IR] as the threshold value, those pixels having pixel values between the average pixel value: Mean [IR] and the non-deteriorated pixel value: CF will not be judged as deteriorated pixels although they are really so.

SUMMARY OF THE INVENTION

The present invention has been made in order to solve the above-described drawback of the convention. The primary object of the invention is to provide an improved image processing technique capable of obtaining a good non-deteriorated pixel value for enabling more accurate distinction between non-deteriorated pixels and deteriorated pixels.

For accomplishing the above object, according to one aspect of the present invention, there is proposed an image processing method for obtaining a non-deteriorated pixel value as a pixel value of a pixel free from a defect such as scar or dust from non-visible beam image information obtained from a defective recording medium having the scar or dust, the method comprising the steps of:

(1) obtaining a calculated value: Y for each pair of samples of corresponding pixels of visible beam image information and said non-visible beam image information both obtained from said recording medium, $$Y=\text{Mean}[IR]-IR+X,$$

where, Mean [IR] is an average pixel value of said non-visible beam image information, IR is a pixel value of the non-visible beam image information and X is a pixel value of the visible beam image information;

(2) obtaining a regression equation with said pixel value: X of the visible beam image information as an independent variable and said calculated value: Y as a dependent variable; and (3) deriving said non-deteriorated image pixel value from said regression equation.

With the above-described method, by using the average pixel value of non-visible beam image information as a "provisional" non-deteriorated pixel value, the effect amount (loss amount) due to the defect is obtained by subtracting the pixel value of the non-visible beam image information from the average pixel value of the non-visible beam image information. Then, by adding the resultant loss amount value to the pixel value of the visible beam image information, a calculated value is obtained. Therefore, this calculated value becomes a pixel value comprising the measured pixel value of the visible beam image information from which the effect from the defect has been eliminated, namely, a "provisionally corrected" pixel value. However, as the average pixel value of the non-visible beam image information is used as the provisional non-deteriorated pixel value, due to the above-described problem, this "provisionally corrected" pixel value tends to be lower than the "truly corrected" pixel value.

Then, according to the feature of the present invention, the process further obtains a regression equation with the pixel value: X of the visible beam image information as an independent variable and the calculated value: Y as a dependent variable; and from this regression equation, the non-deteriorated pixel value with higher accuracy is derived.

For instance, by adding a displacement of the regression equation from a "reference" regression equation for the case of the non-deteriorated pixel value being equal to the average pixel value, to the average pixel value as the provisional non-deteriorated pixel value, an accurate non-deteriorated pixel value can be obtained.

In any case, with this good non-deteriorated pixel value, any displacement from the truly corrected pixel value has been corrected through the use of the regression analysis after the average pixel value of the non-visible beam image information was obtained as the provisional non-deteriorated pixel value. Hence, this non-deteriorated pixel value is stable against possible variation in the pixel value due to e.g. noise.

The non-deteriorated pixel value obtained by the above method of the invention is stable against pixel value variation due to noise or the like, so that this value can be used with high accuracy as the threshold value employed for the distinction between a non-deteriorated pixel and a deteriorated pixel.

That is, if CF is the good non-deteriorated pixel value obtained by the invention's method for correcting visible beam image information based on the non-visible beam image information and the visible beam image information both obtained from a defective recording medium having scar, dust or the like, then, the corrected (truly corrected) pixel value: Z is calculated as follows.

$$Z=CF-IR+X,$$

where IR is a pixel value of the non-visible beam image information and X is a pixel value of the visible beam image information.

Preferably, in the above-described method, the non-deteriorated pixel value is obtained by adding an Y-displacement amount of said linear regression equation from a reference regression equation for the calculated value: Y being equal to the pixel value: X of the visible beam image information to said average pixel value of the non-visible beam image information.

According to one preferred embodiment of the present invention, in said step of obtaining the regression equation, the method obtains this regression equation only for those samples (pixels) whose calculated values: Y are smaller than the pixel values X of the visible beam image information. Namely, if the calculated value: Y of a pixel exceeds its pixel value: X of the visible beam image information, this generally means that this pixel has experienced the beam diffusion loss due to the defect, then, it will be advantageous to preclude this pixel from the regression analysis to be carried out for obtaining the non-deteriorated pixel value: CF.

Further, by repeatedly effecting the above steps (1) through (3) with using the obtained good non-deteriorated pixel value, an even more accurate non-deteriorated pixel value can be obtained.

Preferably, the non-visible beam image information comprises infrared image information obtained from the recording medium with using an infrared and the visible beam image information comprises visible information of the red beam component. This is because the vicinity of wavelength ranges of these beams is believed provide similarity of the effects thereon from the defect.

In addition to the image processing method described above, the present invention encompasses within its scope a program for causing a computer to execute said image processing method as well as a recording medium storing such program therein.

According to a further aspect of the present invention, there is proposed an image processing apparatus for correcting visible beam image information based on non-visible beam image information, the visible beam image information and the non-visible beam image information being obtained from a defective recording medium having a defect of scar, dust or the like, the apparatus comprising:

(a) a preprocessing section for obtaining a calculated value: Y for each pair of samples of corresponding pixels of said visible beam image information and said non-visible beam image information both obtained from said recording medium, $$Y = \text{Mean}[IR] - IR + X,$$

where, Mean [IR] is an average pixel value of said non-visible beam image information, IR is a pixel value of the non-visible beam image information and X is a pixel value of the visible beam image information;

(b) a regression analysis section for obtaining a regression equation with said pixel value: X of the visible beam image information as an independent variable and said calculated value: Y as a dependent variable; and (c) a first pixel value evaluating section for deriving from said regression equation a non-deteriorated image pixel value: CF free from image deterioration due to the defect; and (d) a second pixel value evaluating section for obtaining a corrected pixel value: Z for a deteriorated pixel in the visible beam image information by a following equation;

$$\text{corrected pixel value: } Z = CF - IR + X,$$

where CF is the non-deteriorated pixel value, IR is the pixel value of the non-visible beam image information and X is the pixel value of the visible beam image information.

Needless to say, the apparatus of the invention may omit the above component (d). With such modified apparatus too, the effect of the invention described hereinbefore in connection with the invention's method can be achieved.

Further and other features and advantages of the invention will become apparent upon reading the following detailed description of preferred embodiments thereof with reference to the accompanying drawings.

BRIEF DESCRIPTION OF THE DRAWINGS

FIG. 9A is a schematic showing an infrared image of a film having a large amount of defect, and FIG. 9B is a schematic showing frequency distribution of pixel values of the infrared image of FIG. 9A.

DESCRIPTION OF THE PREFERRED EMBODIMENTS

Figure 1:
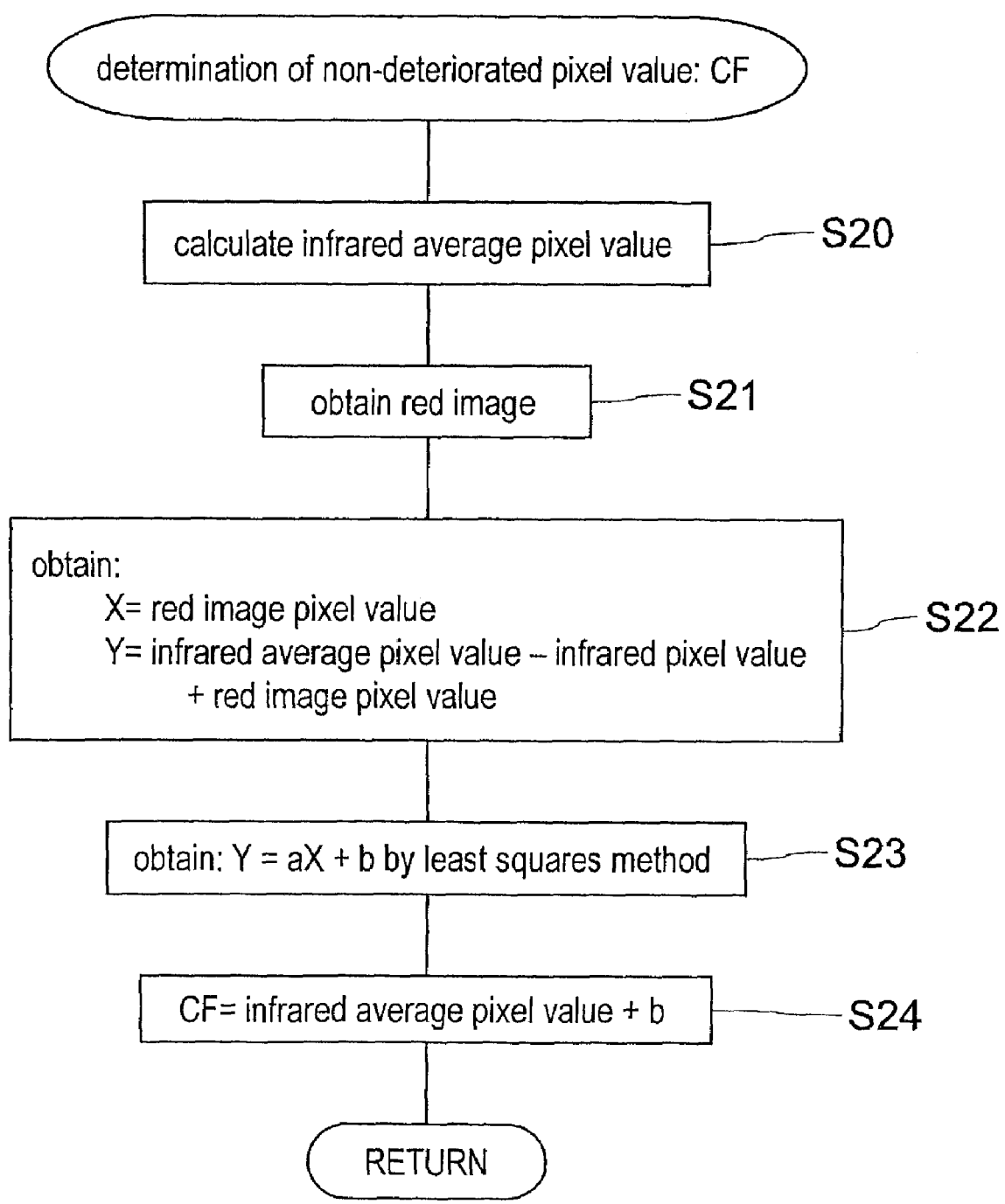
FIG. 1 is a flowchart illustrating in details a process (routine) for determining a non-deteriorated pixel value effected by an image processing method relating to one preferred embodiment of the invention.
Figure 2:
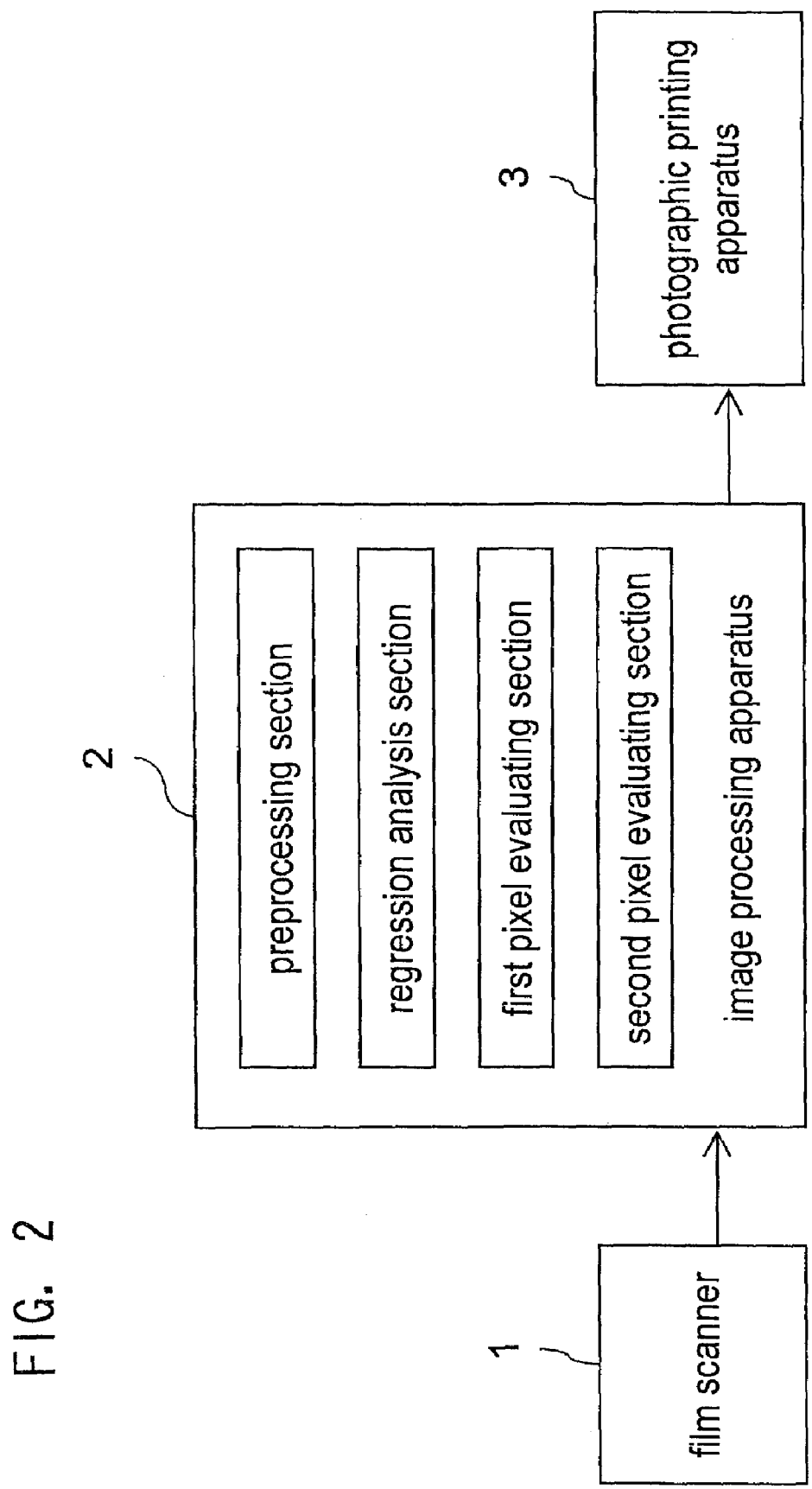
FIG. 2 is a block diagram showing a schematic construction of an image outputting system having an image processing apparatus implementing the invention's method.

One preferred embodiment of the present invention will be described with reference to FIGS. 1 through 6. FIG. 2 is a block diagram showing a schematic construction of an image outputting system including a film scanner 1, an image processing apparatus 2 and a photographic printing apparatus 3. The image processing apparatus 2 implements a technique according to the invention.

The film scanner 1 is adapted for irradiating an optical beam from a beam source on a negative as a photographic film and then receiving its transmission beam by means of e.g. CCD, thus reading an image recorded on the film. Then, the film scanner 1 outputs the read image data (image information) for its red component, green component and blue component respectively to the image processing apparatus 2. In the following discussion, the image data of the red component, green component and blue component will be referred to respectively as "red image information", "green image information" and "blue image information". And, the term "visible beam image information" will be used for generically referring to all of these.

Further, in the present embodiment, the film scanner 1 is configured for outputting also transmission optical beam of an infrared region and receiving its transmission beam by a CCD or the like and then outputting this to the image processing apparatus 2 as infrared image information (an example of "non-visible beam image information") containing information about defect present on the film.

The photographic printing apparatus 3 is configured for exposing a print paper as a photosensitive material according to the image data processed by the image processing apparatus 2, thereby to print an image on the print paper. The printing apparatus 3 includes a beam print head operable to irradiate an optical beam according to digital data on the print paper. As this print head, there is employed an optical modulator capable of modulating the irradiating optical beam to the print paper for each pixel according to the digital image data. Specifically, such beam print head can be any of a variety of devices using e.g. PLZT, DMD (digital micromirror device), LCD (liquid crystal display), LED (light emitting diode) panel, laser, FOCRT (fiber optic cathode ray tube), CRT (cathode ray tube). Selection among these can be made appropriately depending on a required specification for image exposure.

Incidentally, this photographic printing apparatus 3 can be constructed as an automatic printer capable of effecting both scanning of a negative and exposure of a print paper. In such case, if the image outputting system includes an automatic printer for automatically effecting a series of operations from image reading to printing and the image processing apparatus 2 connected thereto and comprising e.g. a PC (personal computer), the entire system can be constructed simple.

With the image processing apparatus 2, by using the visible beam image information and the infrared image information transmitted from the film scanner 1, determination is made whether a pixel is a defective pixel or not. For a defective pixel, the visible beam image information is corrected for eliminating effect from the defect. Then, the apparatus 2 generates print data based on the corrected visible beam image information and transmits this print data to the photographic printing apparatus 3. For effecting such correction to compensate for defect effect, this image processing apparatus 2 includes, in the form of hardware and/or software, a preprocessing section 21, a regression analysis section 22, a first pixel evaluating section 23 and a second pixel evaluating section 24.

Next, this correcting process effected by the image processing apparatus 2 will be described with reference to FIGS. 1 and 3.

Figure 3:
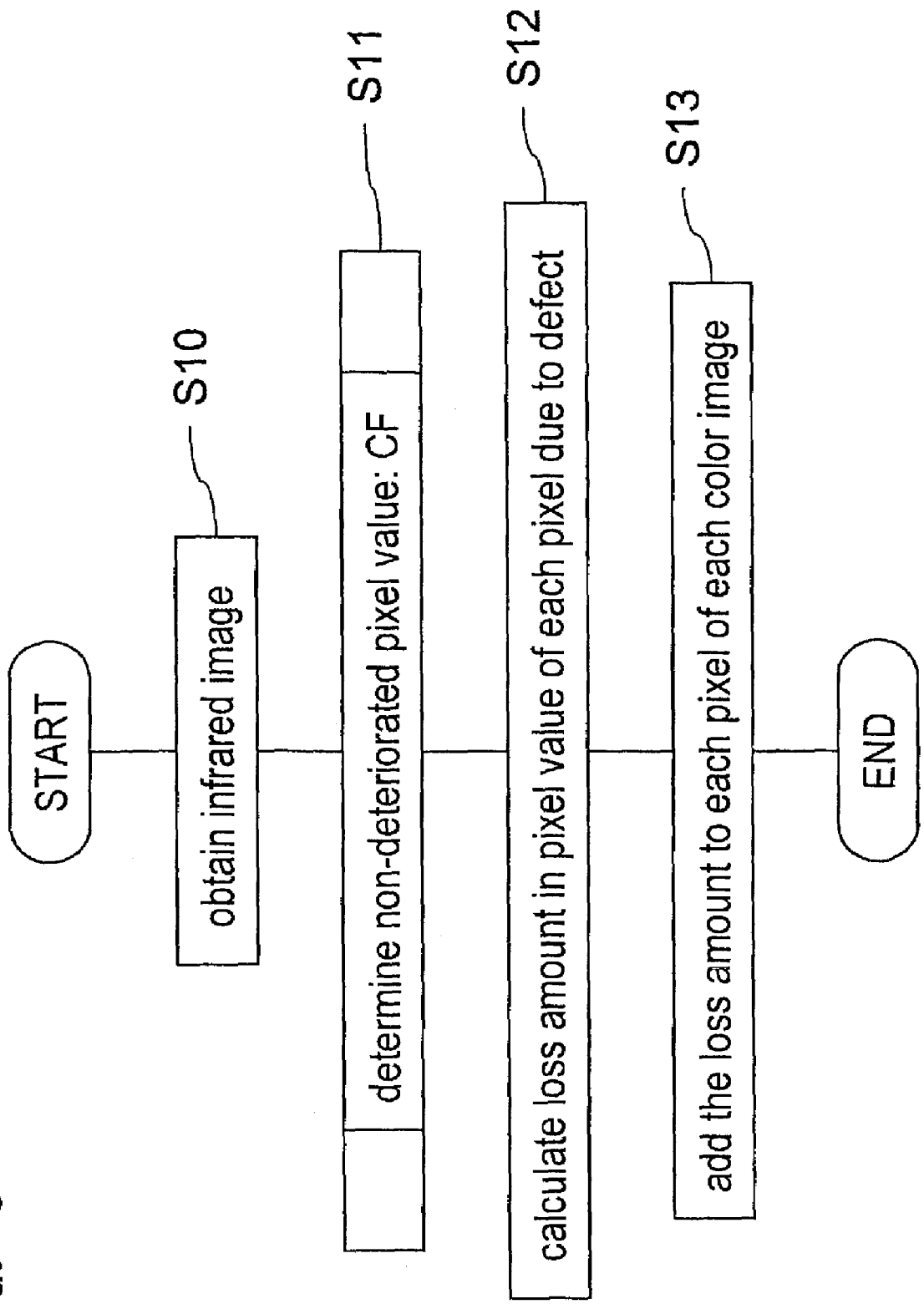
FIG. 3 is a flowchart schematically illustrating a correcting process (routine) of a deteriorated pixel relating to one embodiment of the invention.

First, as illustrated in the flowchart of FIG. 3, the process obtains both the visible beam image information and the infrared image information (an example of "non-visible beam image information") from the film scanner 1 (step 10) (In the following discussion, steps will be denoted respectively with an abbreviation of S). Then, the process determines a non-deteriorated pixel value: CF as a pixel value of a non-defective pixel (S11). A routine for determining this non-deteriorated pixel value: CF is executed by the preprocessing section 21, the regression analysis section 22 and the first pixel evaluating section 23. Details of this routine will be described later.

Next, at the second pixel evaluating section 24, a pixel value of each pixel of the infrared image information is subtracted from the determined non-deteriorated pixel value: CF to obtain a (beam diffusion) loss amount in the pixel value of the pixel due to the effect from the defect (S12). Then, this calculated loss amount is added respectively to the corresponding pixel values of the red image information, green image information and blue image information, thereby to obtain respective corrected pixel values, which are then transmitted as corrected image data to the photographic printing apparatus 3 (S13).

Incidentally, it is preferred that the calculation of the loss amount and the addition at steps S12, S13 described above be effected only for those pixels which are determined as being "defective". This is because any loss amount of pixels which were determined as being "non-defective" is attributable not to a film defect, but to other factors including noise, sensitivity of each pixel of the CCD camera, irregularity in the film and so on. Further, it is also possible to effect other image processing such as image-sharpening process, color adjustment process on the corrected image data before outputting the data to the photographic printing apparatus 3.

Next, the details of the routine (S11) for determining the non-deteriorated pixel value: CF will be described with reference to FIG. 1. In the instant embodiment, the regression analysis effected by the regression analysis section 22 is a single regression analysis, which provides a linear regression equation. In this analysis, the least squares method is employed. Further, the pixel value of the infrared image information as the non-visible beam image information is represented as IR (i, j) and the red image information as the visible beam image information is represented as X (i, j). (i, j) in the form of matrix representation of image information having i units of pixels in the row and j units of pixels in the column.

First, as an average value of pixel values of all the pixels included in the infrared image information, an infrared average pixel value: Mean [IR] is calculated (S20); where $$\text{Mean}[IR] = \Sigma IR(i,j)/i*j$$

In the case of an image having a large amount of defect, there will occur reduction in the pixel values of the infrared image data: IR (i, j) as described above. So, the infrared average pixel value: Mean [IR] will be correspondingly low.

Next, the process obtains from the scanner 1 the red image information, that is, the pixel value of each pixel: X (i, j) (S21). In this, if the red image information has already been transmitted from the film scanner 1 to the image processing apparatus 2 and stored at its storage unit (not shown) of this image processing apparatus 2, the process simply retrieves the red image information from the storage unit.

Further, the process obtains a calculated value: Y (i, j)=Mean [IR]−IR (i, j)+X (i, j) (S22). Incidentally, the calculations of the infrared average pixel value: Mean [IR] and the calculated value: Y (i, j) are effected by the preprocessing section 21. This calculated value means a (provisionally) corrected pixel value of the infrared image information obtained with using the infrared average pixel value: Mean [IR] as the provisional non-deteriorated pixel value: CF.

Thereafter, the regression analysis unit 22 obtains a regression equation with using the pixel value: X (i, j) of the visible beam image information as an independent variable and the calculated value: Y (i, j) as a dependent variable. In this embodiment, since the regression analysis section 22 effects a single regression analysis, the resultant regression equation is: Y=aX+b (a and b are coefficients) (S23). Since a can be considered substantially equal to 1, only b is obtained.

Figure 4:
FIG. 4 is a view showing an exemplary infrared image employed by the embodiment.
Figure 5:
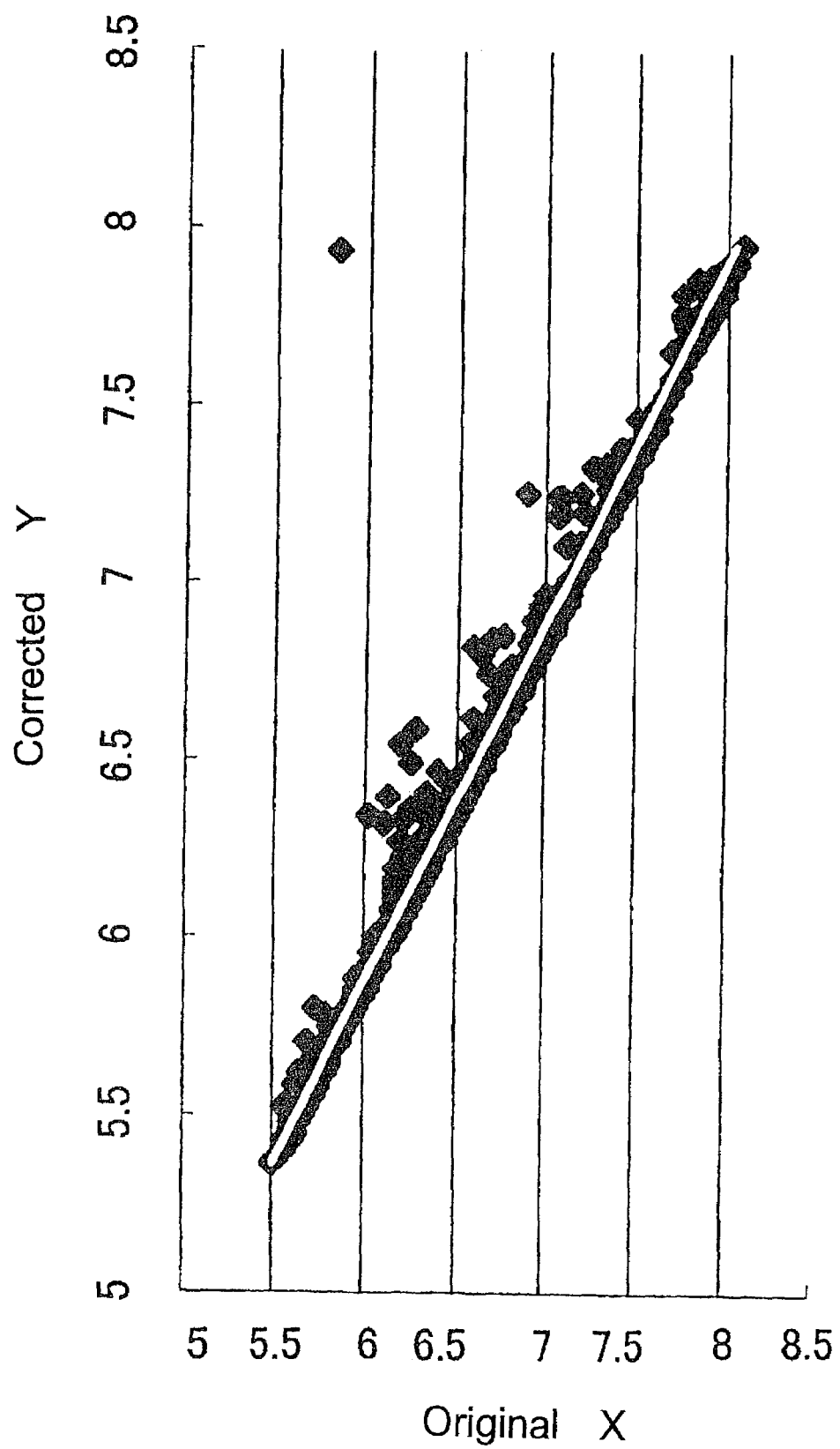
FIG. 5 is a graph obtained by effecting a regression analysis of the infrared image of FIG. 4.

FIG. 5 shows plotting of the relationship between the red image information pixel values: X (i, j) and the calculated values: Y (i, j) obtained from a photographic film frame providing the infrared image information shown in FIG. 4. In FIG. 4, the dark portions denote defects such as scars or dust present on the film frame. In FIG. 5, the horizontal axis represents the red image pixel values: X (i, j) and the vertical axis represents the calculated values: Y (i, j). The numerical values on these horizontal and vertical axes are natural logarithmic values of the 12-bits (0 to 4095) pixel values. The white line drawn along the area where plotting dots are present in high density represent the regression equation: Y=X+b obtained by the single regression analysis.

Figure 6:
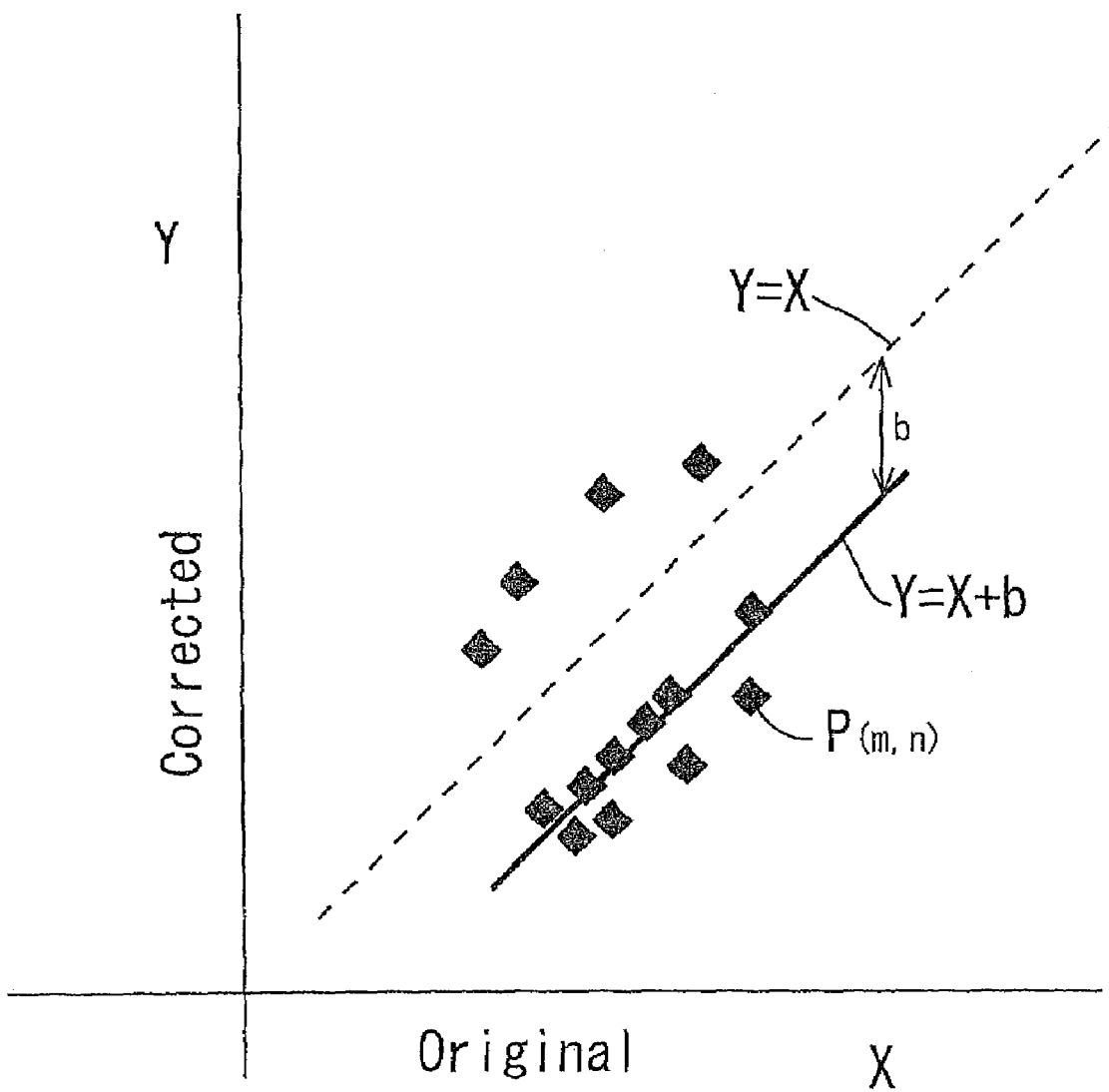
FIG. 6 is a schematic of the graph of FIG. 5.

FIG. 6 shows a normalization of the graph of FIG. 5 for better visual understanding. In this FIG. 6, the regression equation: Y=X+b is shown as a solid line. In this, a regression equation for the calculated value: Y being equal to the visible beam image information: X is expressed as: Y=X and this equation as a "reference" regression equation is shown as a dotted line in the figure. Referring to a single particular plotted dot: P (m, n) located adjacent the regression equation (Y=X+b) in FIG. 6, for this particular plotted dot, the pixel value of the red image information is grater than the calculated value, namely, the corrected pixel value, meaning "inappropriate" for the purpose of compensation for effect from the defect. This "inappropriateness" however, is attributable to the fact that the infrared average pixel value: Mean [IR] was used as the provisional non-deteriorated pixel value: CF. That is, due to the effect from the large amount of defect present on the film, the infrared average pixel value: Mean [IR] has diminished significantly from the "true" deteriorated pixel value: CF.

In order to solve this problem, it is necessary to add a certain amount to the infrared average pixel value: Mean [IR] to make it approximate the true deteriorated pixel value: CF. Hence, in order to obtain such addition amount, the method of the invention employs the regression equation: Y=X+b obtained with using the visible image information pixel value: X (i, j) as an independent variable and the calculated value: Y (i, j) as a dependent variable.

That is to say, by adding the Y-displacement amount of the regression equation: Y=X+b from the above-described reference regression equation: Y=X to the infrared average pixel value, the above-described "inappropriateness" can be dissolved significantly. Specifically, the non-deteriorated pixel value: CF used for the defect correction is determined by the equation: CF=Mean [IR]+b (S24).

After a "good" or appropriate non-deteriorated pixel value: CF is obtained in the manner above, this non-deteriorated pixel value determining routine returns to S12 shown in FIG. 3.

In this embodiment, the infrared average pixel value: Mean [IR] was 200, whereas the non-deteriorated pixel value: CF obtained by the above-described method was 209. By using as the threshold value this non-deteriorated pixel value: CF, rather than the infrared average pixel value, the distinction between a deteriorated pixel and a non-deteriorated pixel can be made with higher accuracy.

Figure 7:
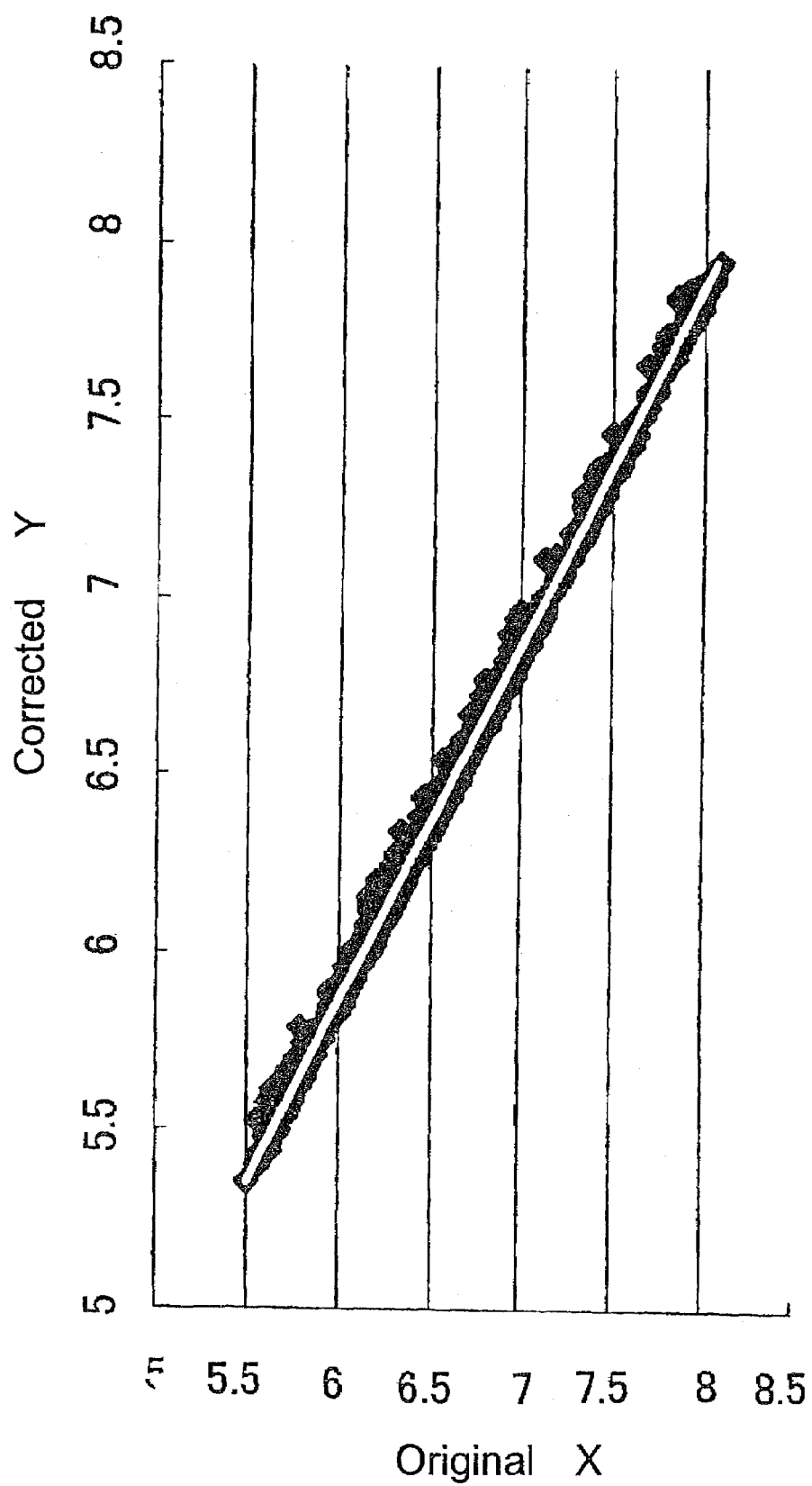
FIG. 7 is a graph obtained by effecting a modified regression analysis precluding defective pixels.
Figure 8A:
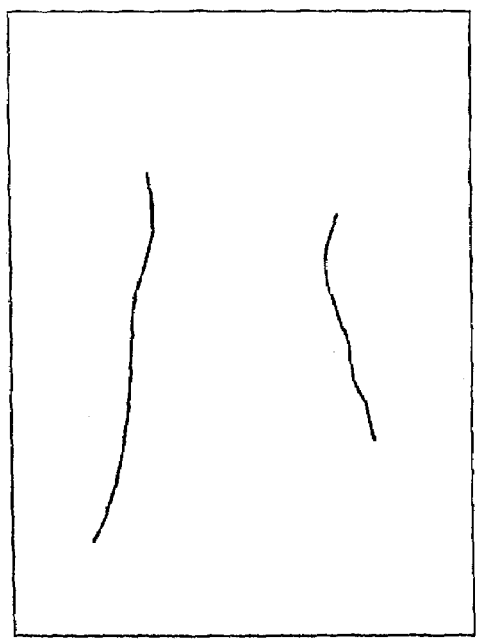
FIG. 8A is a schematic showing an infrared image of a film having a small amount of defect.
Figure 8B:
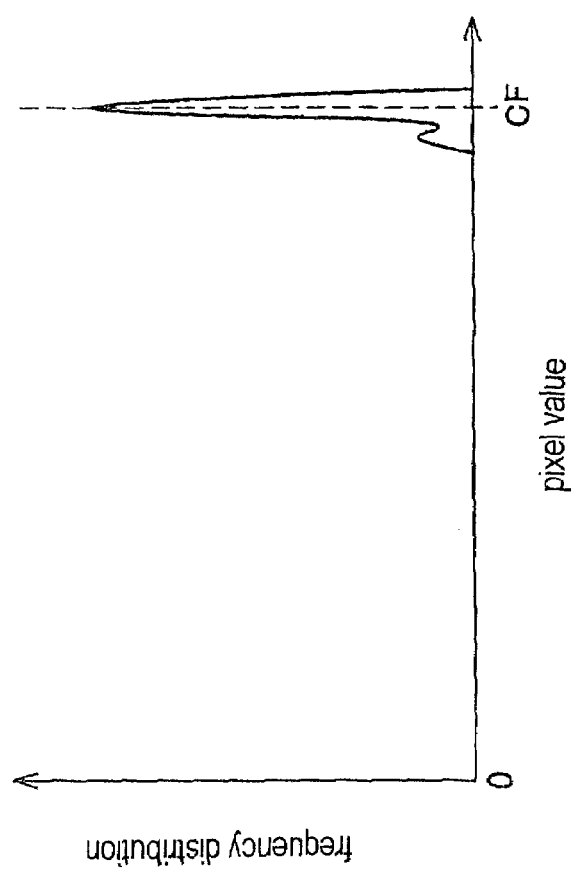
FIG. 8B is a schematic showing frequency distribution of pixel values of the infrared image of FIG. 8A.

In the foregoing embodiment, when the regression equation: Y=X+b is obtained with the visible beam image information pixel value: X (i, j) as an independent variable and the calculated value: Y (i, j) as a dependent variable, this operation is effected for each and every pixel. However, since the above-described "inappropriateness" occurs with those pixels which are hardly effected by the defect, it will be better to put only such pixels substantially free from effect from the defect to the subject of the regression analysis. That is to say, by putting those samples (pixels) whose calculated values: Y (i, j) are smaller than the visible beam image information pixel values: X (i, j) to the subject of the regression analysis, it is possible to obtain an even more appropriate non-deteriorated pixel value: CF. FIG. 7 graphically shows the result of such modified regression analysis directed only to those samples (pixels) whose calculated values: Y (i, j) are smaller than the visible beam image information pixel values: X (i, j). This will result in the advantageous reduction in the number of pixels to be processed by the regression analysis, whereby a secondary advantage of speeding up the regression analysis operation may be achieved.

Further, if a pixel of the infrared image information has a pixel value smaller than 5.7 (logarithmic value), this pixel can apparently be interpreted as a "defective" pixel. Hence, such pixel can be precluded from the subject of the regression analysis. Moreover, since any non-deteriorated pixel value: CF normally has a value greater than 7.5 (logarithmic), it will also be possible that the regression analysis be effected on only those such pixels in the infrared image information having values greater than 7.5. In this case too, a similar effect to that described above can be obtained.

Also, by effecting another regression analysis in repetition with substitution of the non-deteriorated pixel vale: CF obtained by the foregoing regression analysis for the infrared average pixel value thereby to obtain the calculated value: Y (i, j), an even more appropriate or accurate non-deteriorated pixel value: CF may be obtained.

Incidentally, in the foregoing embodiment, the infrared was employed for detection of defects. However, since an image recorded on a film is color-developed basically only within the visible light wavelength range, the defect detection can be effected by any other beam having a desired wavelength as long as such other beam too can be transmitted through the film-recorded image without being modulated thereby.

Further, in the foregoing embodiment, the infrared image and the red image were employed for the regression analysis. This is because, as described hereinbefore, the vicinity of wavelength ranges of these beams is believed to provide similarity of the effects thereon from the defect. Therefore, provided such similarity of the effects from the defect to that of the infrared image is assured, visible beam images of other colors, i.e. the green image or the blue image, may also be used for the regression analysis.

The invention may be embodied in other specific forms without departing from the essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

The invention claimed is:

1. An image processing method for obtaining a non-deteriorated pixel value as a pixel value of a pixel free from a defect such as scar or dust from non-visible beam image information obtained from a defective recording medium having the scar or dust, the method comprising the steps of:
   obtaining a calculated value: Y for each pair of samples of corresponding pixels of visible beam image information and said non-visible beam image information both obtained from said recording medium, $Y=\text{Mean}[IR]-IR+X,$ where, Mean [IR] is an average pixel value of said non-visible beam image information, IR is a pixel value of the non-visible beam image information and X is a pixel value of the visible beam image information;
   obtaining a regression equation with said pixel value: X of the visible beam image information as an independent variable and said calculated value: Y as a dependent variable; and
   deriving said non-deteriorated image pixel value from said regression equation.

2. The method according to claim 1, wherein the non-deteriorated pixel value is obtained by adding an Y-displacement amount of said linear regression equation from a reference regression equation for the calculated value: Y being equal to the pixel value: X of the visible beam image information to said average pixel value of the non-visible beam image information.

3. The method according to claim 1, wherein in said step of obtaining the regression equation, the method obtains this regression equation only for those samples whose calculated values: Y are smaller than the pixel values X of the visible beam image information.

4. The method according to claim 1, wherein the non-visible beam image information comprises infrared image information obtained from the recording medium with using an infrared and the visible beam image information comprises visible information of the red beam component.

5. The method according to claim 1, wherein said recording medium is a photographic film.

6. An image processing method for correcting visible beam image information based on non-visible beam image information and the visible image information both obtained from a defective recording medium having a defect of a scar, dust or the like, the method comprising the steps of:
   obtaining a calculated value: Y for each pair of samples of corresponding pixels of said visible beam image information and said non-visible beam image information both obtained from said recording medium, $Y=\text{Mean}[IR]-IR+X,$ where, Mean [IR] is an average pixel value of said non-visible beam image information, IR is a pixel value of the non-visible beam image information and X is a pixel value of the visible beam image information;

obtaining a regression equation with said pixel value: X of the visible beam image information as an independent variable and said calculated value: Y as a dependent variable;

deriving from said regression equation a non-deteriorated image pixel value: CF free from image deterioration due to the defect; and obtaining a corrected pixel value: Z for a deteriorated pixel in the visible beam image information by a following equation;

corrected pixel value: $Z=CF-IR+X$, where CF is the non-deteriorated pixel value, IR is the pixel value of the non-visible beam image information and X is the pixel value of the visible beam image information.

7. The method according to claim 6, wherein the method specifies the deteriorated pixel by using the derived non-deteriorated pixel value.

8. A computer readable medium for causing a computer to execute an image processing method for obtaining a non-deteriorated pixel value as a pixel value of a pixel free from a defect such as a scar or dust from non-visible beam image information obtained from a defective recording medium having the scar or dust, the method comprising the steps of:

obtaining a calculated value: Y for each pair of samples of corresponding pixels of visible beam image information and said non-visible beam image information both obtained from said recording medium, $Y=\text{Mean}[IR]-IR+X$, where, Mean [IR] is an average pixel value of said non-visible beam image information, IR is a pixel value of the non-visible beam image information and X is a pixel value of the visible beam image information;

obtaining a regression equation with said pixel value: X of the visible beam image information as an independent variable and said calculated value: Y as a dependent variable; and deriving said non-deteriorated image pixel value from said regression equation.

9. An image processing apparatus for correcting visible beam image information based on non-visible beam image information and the visible image information both obtained from a defective recording medium having a defect of a scar, dust or the like, the apparatus comprising:

a preprocessing section for obtaining a calculated value: Y for each pair of samples of corresponding pixels of the visible beam image information and said non-visible beam image information both obtained from said recording medium, $Y=\text{Mean}[IR]-IR+X$, where, Mean [IR] is an average pixel value of said non-visible beam image information, IR is a pixel value of the non-visible beam image information and X is a pixel value of the visible beam image information;

a regression analysis section for obtaining a regression equation with said pixel value: X of the visible beam image information as an independent variable and said calculated value: Y as a dependent variable; and a first pixel value evaluating section for deriving from said regression equation a non-deteriorated image pixel value: CF free from image deterioration due to the defect; and a second pixel value evaluating section for obtaining a corrected pixel value: Z for a deteriorated pixel in the visible beam image information by a following equation;

corrected pixel value: $Z=CF-IR+X$, where CF is the non-deteriorated pixel value, IR is the pixel value of the non-visible beam image information and X is the pixel value of the visible beam image information.

* * * * *